United States Patent [19]

McMath

[11] Patent Number: 4,687,024
[45] Date of Patent: Aug. 18, 1987

[54] NOZZLE HAVING DUAL HOSE SWIVEL
[75] Inventor: Jack A. McMath, Fort Thomas, Ky.
[73] Assignee: Dover Corporation, New York, N.Y.
[21] Appl. No.: 823,936
[22] Filed: Jan. 29, 1986

Related U.S. Application Data

[63] Continuation of Ser. No. 506,850, Jun. 22, 1983, abandoned.

[51] Int. Cl.⁴ .............................................. F16L 39/04
[52] U.S. Cl. ..................................... 137/615; 285/168
[58] Field of Search ................. 137/615; 285/168, 131

[56] References Cited

U.S. PATENT DOCUMENTS

| | | | |
|---|---|---|---|
| 2,354,416 | 7/1944 | Phillips | 285/168 |
| 2,745,682 | 5/1956 | Chevallier | 285/168 X |
| 3,558,163 | 1/1971 | Moore et al. | 285/168 |
| 3,981,329 | 9/1976 | Wohlwend | 137/615 |
| 3,990,731 | 11/1976 | Schnipke | 285/168 X |
| 4,068,687 | 1/1978 | Long | 141/290 |
| 4,090,539 | 5/1978 | Krupp | 141/392 X |
| 4,103,938 | 8/1978 | Lasater et al. | 285/168 X |

Primary Examiner—A. Michael Chambers
Assistant Examiner—John C. Fox
Attorney, Agent, or Firm—Kinney & Schenk

[57] ABSTRACT

A dual hose swivel has one end connected to a gasoline dispensing nozzle and its other end connected to a liquid supply hose and a vapor recovery hose. The swivel has a main body rotatably supported by the nozzle for rotation about a first axis and a pair of swivel tails, which are connected to each other, rotatably supported by the main body for rotation about a second axis substantially perpendicular to the first axis. Each of the swivel tails has one of the hoses connected to a separate threaded passage. The main body can rotate through 360° relative to the nozzle body and the swivel tails can rotate together about the second axis through at least 180°.

12 Claims, 11 Drawing Figures

NOZZLE HAVING DUAL HOSE SWIVEL

This is a continuation of application Ser.No. 506,850 filed June 22, 1983, now abandoned.

This invention relates to a swivel and a nozzle with which the swivel is used and, more particularly, to a dual hose swivel for use with a liquid dispensing nozzle having vapor recovery.

To reduce air pollution by gasoline vapors from filling vehicle tanks at service stations, gasoline dispensing nozzles have been equipped with means for sealing the filler pipe of vehicles so that the vapor within the vehicle tank is returned through the nozzle body and a hose, which is separate from the supply hose, connected to the body to return the vapor to a vapor recovery tank or the like. Thus, two hoses are connected to the nozzle body. When the nozzle body is inserted in various types of vehicle filler pipes, the hoses have a tendency to prevent easy maneuvering of the nozzle body because of interference between the two hoses when turning the nozzle body to position it within the filler pipe.

One previously suggested arrangement for mounting a vapor recovery hose and a gasoline supply hose to a nozzle body is disclosed in U.S. Pat. No. 4,090,539 to Krupp. The aforesaid Krupp patent uses a coupling having a swivel nut for threading into the end of the nozzle body and has the two hoses concentrically mounted relative to each other and rotatable relative to each other about a single axis, which is in alignment with a threaded receptacle in the nozzle body. Thus, the aforesaid Krupp patent requires the hoses to be concentric with one of the hoses inside of the other whereby further fittings are necessary to connect the two concentric hoses to a gasoline supply tank and to a vapor return area. This is a cumbersome arrangement and cannot have separate hoses extending from the nozzle body.

In addition to the aforesaid Krupp patent, each of U. S. Pat. Nos. 3,980,112 to Basham, 3,986,732 to Stanley, and 4,260,183 to Krupp has a swivel connector connecting two hoses to a nozzle body with the two hoses having to be concentric. Thus, each of these has the same problems as the aforesaid U. S. Pat. No. 4,090,539 to Krupp.

U. S. Pat. No. 4,103,938 to Lasater et al has a swivel connector connecting two hoses to a nozzle body without requiring the two hoses to be concentric. However, a more complex swivel connector is used than the swivel of the present invention.

The swivel of the present invention enables the two hoses to be separate from each other and to be able to be moved without interference with each other. The swivel of the present invention accomplishes this through providing rotation about two axes, which are perpendicular to each other.

The nozzle of the present invention has a unique passage construction to enable easy connection of the swivel thereto. The nozzle has the liquid supply passage surrounded by the vapor recovery passage and concentric therewith.

An object of this invention is to provide a unique swivel for a vapor recovery nozzle.

Another object of this invention is to provide a liquid dispensing nozzle having vapor recovery with a unique passage construction.

Other objects, uses, and advantages of this invention are apparent upon a reading of this description, which proceeds with reference to the drawings forming part thereof and wherein:

Figure 1:
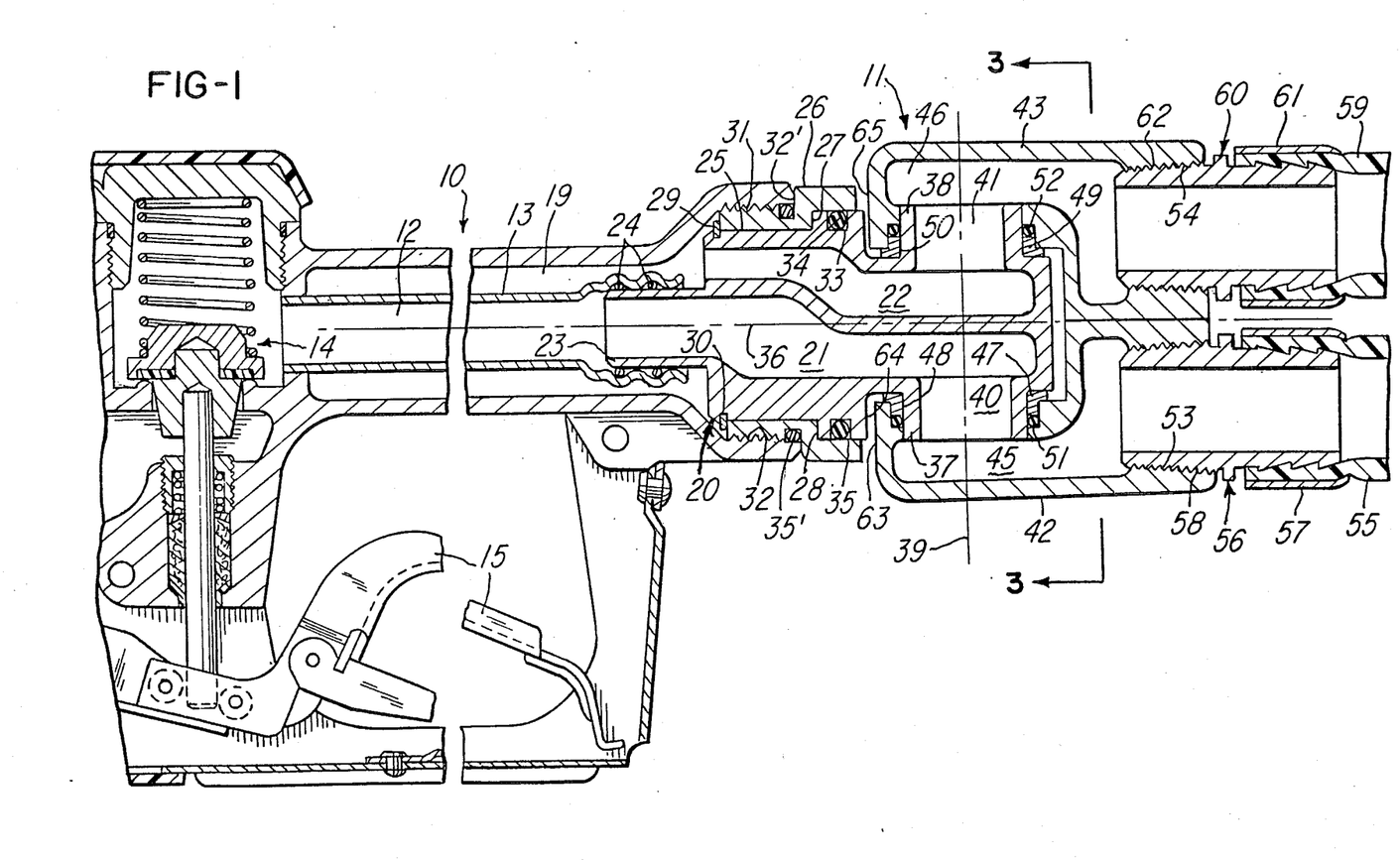
FIG. 1 is a sectional view of a portion of a gasoline dispensing nozzle having one embodiment of the swivel of the present invention connected thereto.

Referring to the drawings and particularly FIG. 1, there is shown a liquid dispensing nozzle body 10 having a swivel 11 of the present invention connected at one end thereof. The body 10 has an inlet passage 12, which is a tube 13 of circular cross section, through which liquid such as gasoline, for example, flows. The flow of liquid through the passage 12 is controlled by a valve 14, which is movable to an open position by a pivotally mounted handle 15. One suitable example of the flow control of the nozzle body 10 is shown and described in the copending patent application of Robert W. Guertin for "Vapor Recovery System Having Automatic Shut-Off Mechanism," Ser. No. 506,850, filed June 22, 1983. The nozzle body 10 includes automatic shut off of the valve 14 when the liquid in the tank being filled reaches a predetermined level.

Figure 2:
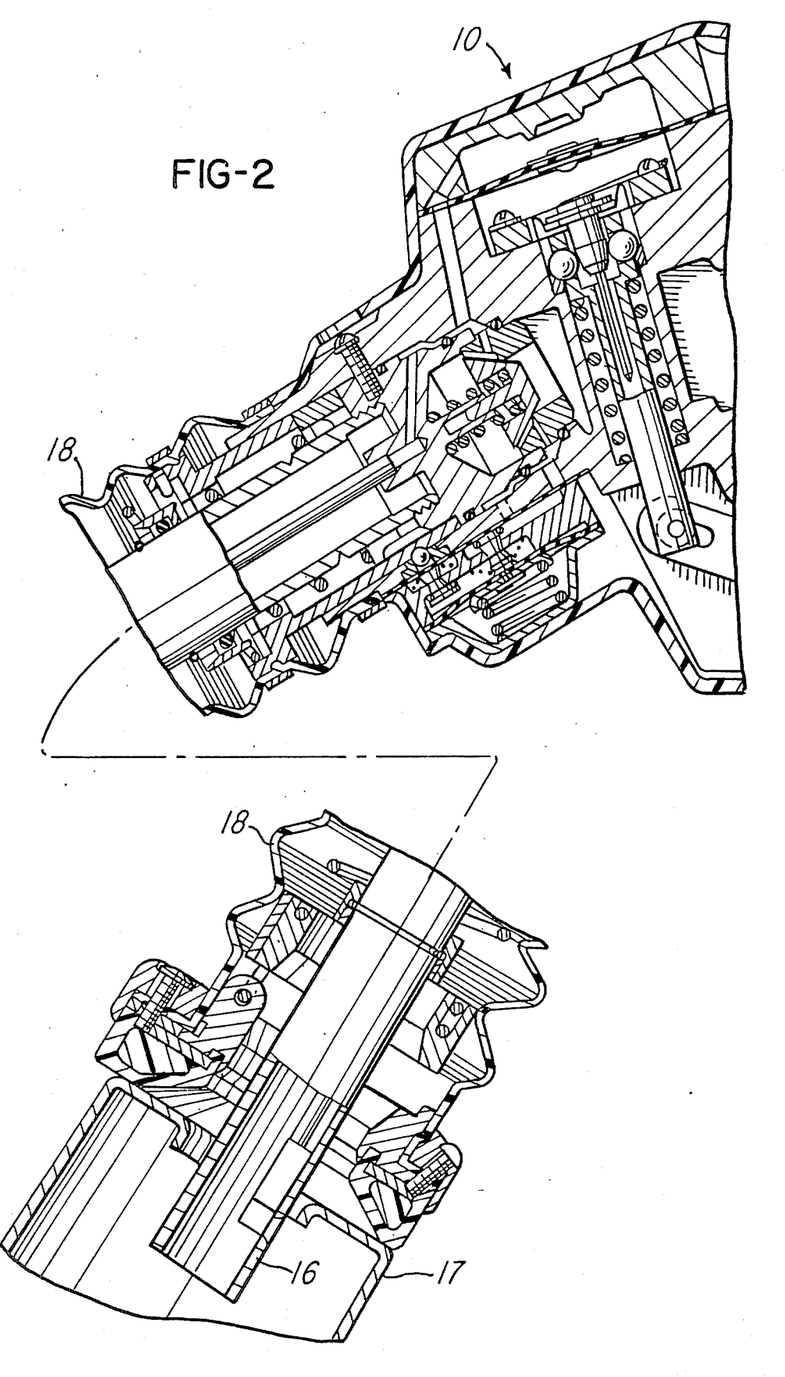
FIG. 2 is a sectional view, partly in elevation, of the remainder of the nozzle of FIG. 1.

The nozzle body 10 has the liquid dispensed through a spout 16 (see FIG. 2) to a fill pipe 17 of a vehicle tank. Vapor within the tank having the fill pipe 17 flows therefrom into the interior of a bellows 18, which is attached to the nozzle body 10. The vapor flows to a vapor recovery passage 19 (see FIG. 1), which is concentric with the inlet passage 12 and is an annular elongated passage between the outer circular surface of the tube 13 and the inner surface of an elongated passage of circular cross section in the nozzle body 10. This concentric arrangement is the invention of applicant.

Figure 7:
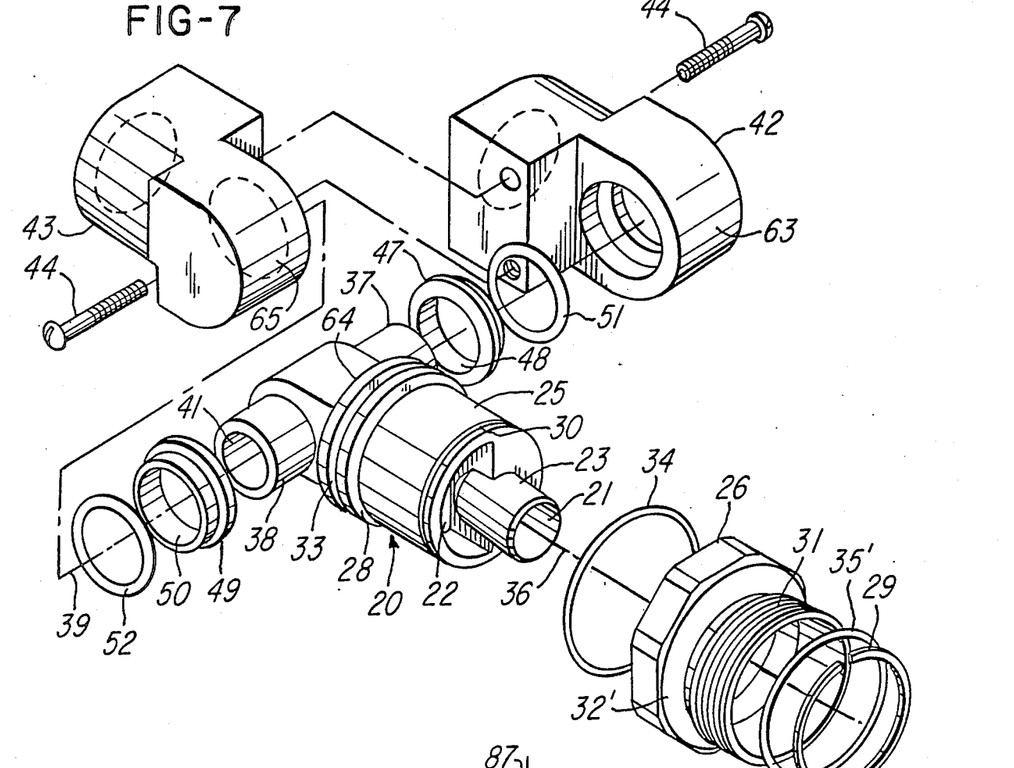
FIG. 7 is an exploded perspective view of the swivel of FIG. 1.

The swivel 11 includes a main body 20 having a first passage 21 communicating with the inlet end of the inlet passage 12 and a second passage 22 communicating with the outlet end of the vapor recovery passage 19. The second passage 22 does not extend around the passage 21 as can be seen in FIG. 7.

The main body 20 has an extension 23, which fits within the enlarged inlet end of the tube 13 (see FIG. 1) of the nozzle body 10. Sealing rings 24, which are O-rings supported by the tube 13, provide a seal between the outer circular surface of the extension 23 of the main body 20 and the inner surface of the tube 13.

The main body 20 has an outer circular surface 25 having a swivel nut 26 rotatably supported thereon. The swivel nut 26 has a shoulder 27 bearing against an annular flange 28 of the main body 20. A retaining ring 29, which is disposed in a groove 30 in the outer circular surface 25 of the main body 20, acts against the end of the swivel nut 26 to retain it on the main body 20.

The swivel nut 26 has threads 31 cooperating with threads 32 at the enlarged outlet end of the inner surface of the vapor recovery passage 19 in the nozzle body 10. Thus, the swivel 11 is connected or attached to the nozzle body 10 through the threads 31 on the swivel nut 26 cooperating with the threads 32 on the nozzle body 10 until a shoulder 32' on the swivel nut 26 abuts the end of the nozzle body 10 as shown in FIG. 1. Because of the retaining ring 29, the swivel 11 is prevented from being withdrawn from the nozzle body 10 after the swivel nut 26 is attached to the nozzle body 10.

The enlarged end of the inner surface of the vapor recovery passage 19 in the nozzle body 10 begins beyond the end of the tube 13. This insures that the extension 23 of the main body 20 is sufficiently disposed within the tube 13 to have both of the sealing rings 24 engaging the outer circular surface of the extension 23 of the main body 20.

The main body 20 has a groove 33 within which is disposed a sealing ring 34, which is an O-ring. The sealing ring 34 cooperates with an inner circular surface 35 of the swivel nut 26 to form a seal between the main body 20 and the swivel nut 26. The sealing ring 34 is protected from dirt or other debris because of the swivel nut 26 overlying the sealing ring 34.

A sealing ring 35', which is an O-ring, is disposed between the swivel nut 26 and the enlarged outlet end of the vapor recovery passage 19 in the nozzle body 10. This prevents leakage between the threads 31 and 32.

Because of the main body 20 being rotatably supported within the swivel nut 26 and having the outer circular surface 25 as a bearing surface, the swivel 11 can rotate through 360° about an axis 36. The axis 36 is aligned with the axis of the inlet passage 12 of the nozzle body 10.

The main body 20 has a first bearing portion 37 and a second bearing portion 38 aligned with each other along an axis 39, which is substantially perpendicular to the axis 36. The first bearing portion 37 has a passage 40 therein communicating with the first passage 21 in the main body 20. The second bearing portion 38 has a passage 41 communicating with the second passage 22 in the main body 20.

Figure 3:
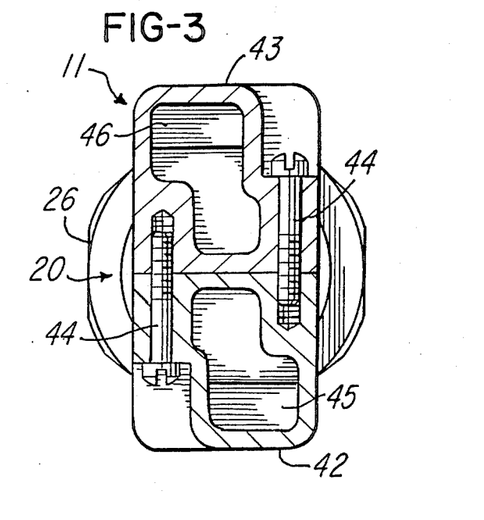
FIG. 3 is a sectional view of the swivel of FIG. 1 and taken along line 3—3 of FIG. 1.
Figure 4:
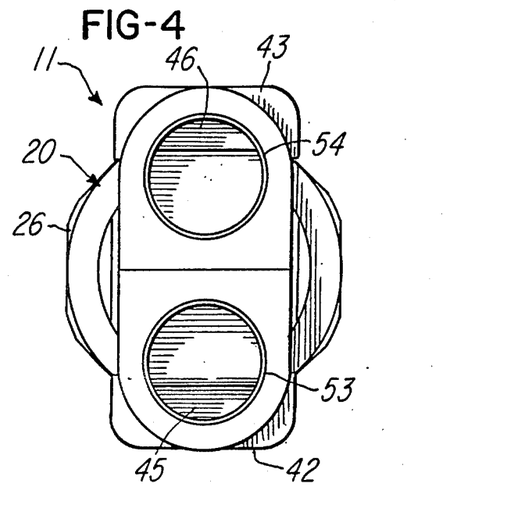
FIG. 4 is an end elevational view of the swivel of FIG. 1 without the hoses connected thereto.

The first bearing portion 37 of the main body 20 rotatably supports a swivel tail or elbow 42 for rotation about the axis 39. The second bearing portion 38 of the main body 20 rotatably supports a swivel tail or elbow 43 for rotation about the axis 39. The swivel tails 42 and 43 are connected to each other by screws 44 (see FIGS. 3 and 7) so that they rotate together about the axis 39 (see FIG. 1).

The swivel tail 42 has a passage 45 therein communicating with the passage 40 in the first bearing portion 37 of the main body 20. The swivel tail 43 has a passage 46 therein communicating with the passage 41 in the second bearing portion 38 of the main body 20. Thus, any rotation of the swivel tails 42 and 43 about the axis 39 always leaves the passage 45 in the swivel tail 42 communicating with the passage 40 in the first bearing portion 37 of the main body 20 and the passage 46 in the swivel tail 43 communicating with the passage 41 in the second bearing portion 38 of the main body 20.

The swivel tail 42 is rotatably supported on an L-shaped bushing 47 for rotation about the axis 39. The bushing 47 has its inner surface 48 functioning as a bearing surface against the outer surface of the first bearing portion 37.

The swivel tail 43 is rotatably supported on an L-shaped bushing 49 for rotation about the axis 39. The L-shaped bushing 49 has its inner surface 50 functioning as a bearing surface against the outer surface of the second bearing portion 38 of the main body 20.

A sealing ring 51, which is an O-ring, is disposed between the L-shaped bushing 47, the outer surface of the first bearing portion 37 of the main body 20, and the swivel tail 42. A sealing ring 52, which is an O-ring, is disposed between the L-shaped bushing 49, the outer surface of the second bearing portion 38 of the main body 20, and the swivel tail 43.

The passage 45 in the swivel tail 42 terminates in a tapered threaded passage 53. The passage 46 in the swivel tail 43 terminates in a tapered threaded passage 54.

A hose 55, which communicates with the tank supplying the gasoline to the nozzle body 10, is connected to the threaded passage 53 through a tubular member 56. The hose is retained on the outer surface of the tubular member 56 by a clamp 57. The tubular member 56 has threads 58 on a tapered portion of its outer surface for cooperation with threads of the tapered threaded passage 53.

A hose 59, which is connected to the vapor recovery area, is connected to the swivel tail 43 by a tubular member 60. The hose 59 is retained on the outer surface of the tubular member 60 by a clamp 61. The tubular member 60 has threads 62 on a tapered portion of its outer surface for cooperation with the threads of the tapered threaded passage 54 to connect the hose 59 thereto.

It should be understood that the hoses 55 and 59 are attached to a pedestal, for example, from which they communicate with the supply tank and the vapor recovery area, respectively. Thus, when the nozzle body 10 is removed from the pedestal for disposition within the fill pipe 17 (see FIG. 2), the nozzle body 10 may have substantial movement relative to the hoses 55 (see FIG. 1) and 59. That is, the nozzle body 10 can rotate through 360° about the axis 36 relative to the swivel 11. This enables the nozzle body 10 to have the spout 16 (see FIG. 2) disposed within the fill pipe 17.

Furthermore, the swivel tails 42 (see FIG. 1) and 43 may rotate about the axis 39 relative to the main body 20. This prevents any interference between the hoses 55 and 59 since they are rotated about the common axis 39.

Figure 5:
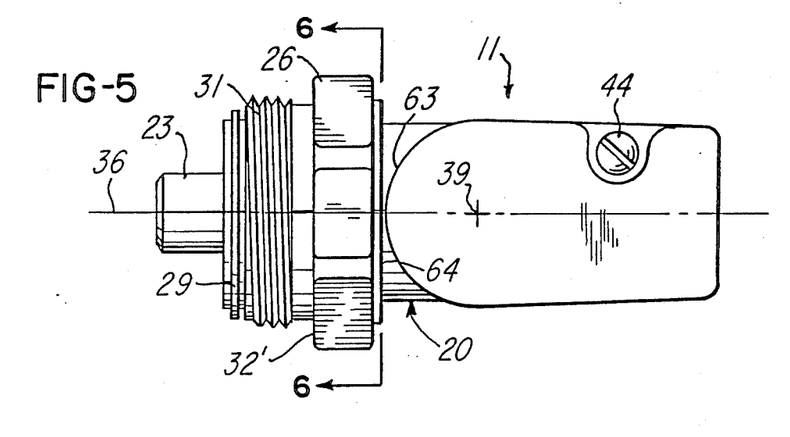
FIG. 5 is a bottom plan view of the swivel of FIG. 1.
Figure 6:
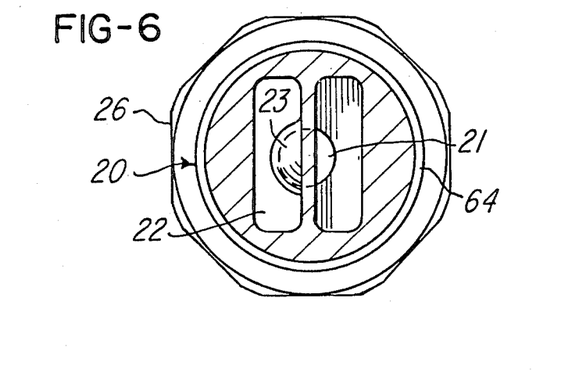
FIG. 6 is a sectional view, partly in elevation, of the swivel and taken along line 6—6 of FIG. 5.

The amount of rotation of the swivel tails or elbows 42 and 43 about the axis 39 is limited by engagement of a portion of the swivel tail 42 beyond each end of an end surface 63 (see FIG. 5) of the swivel tail 42 with an end surface 64 of the main body 20 and engagement of a portion of the swivel tail 43 beyond each end of an end surface 65 (see FIG. 1) of the swivel tail 43 with the end surface 64 of the main body 20. Each of the end surfaces 63 and 65 is curved or arcuate as shown in FIG. 5 for the end surface 63 is formed on a radius with the axis 39 (see FIG. 1) as its center.

Figure 8:
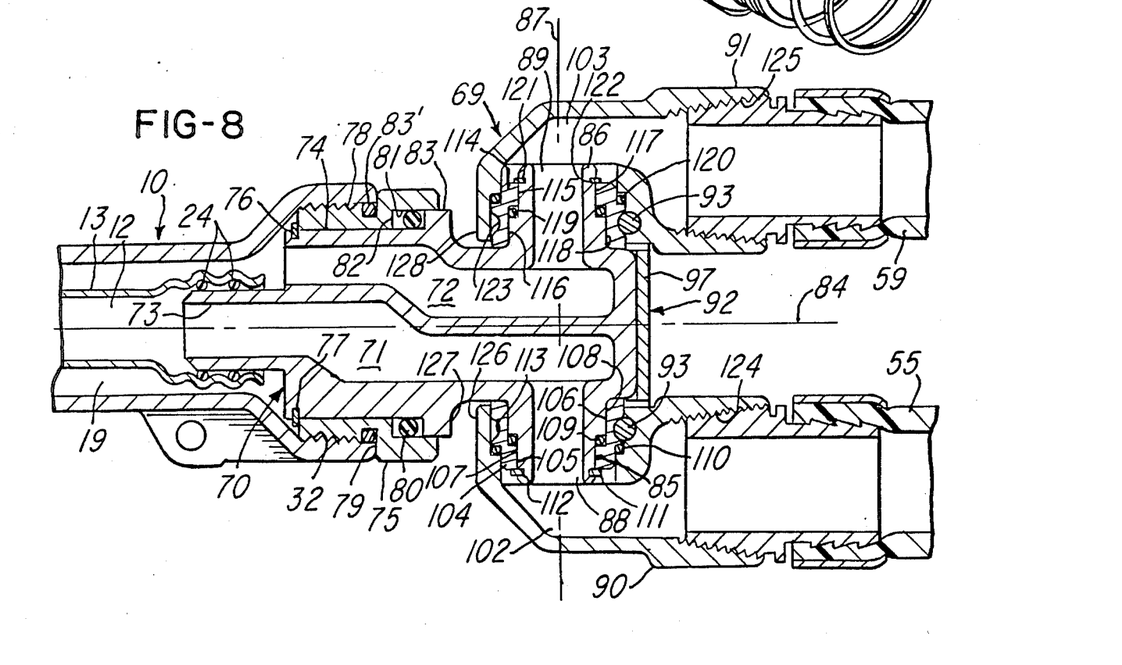
FIG. 8 is a fragmentary sectional view of a portion of the nozzle of FIG. 1 and having a modification of the swivel of the present invention connected thereto.
Figure 11:
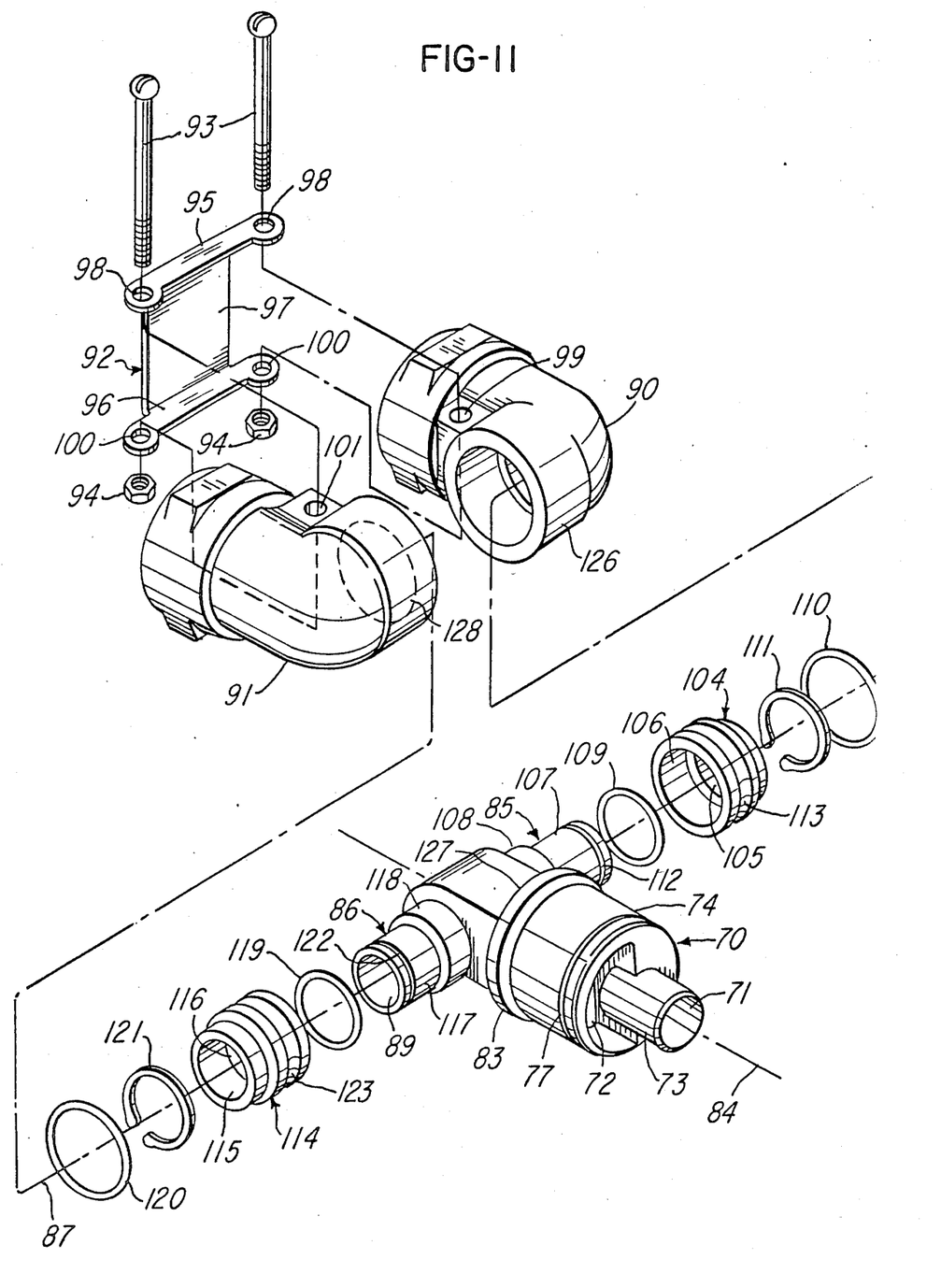
FIG. 11 is an exploded perspective view of the swivel of FIG. 8 without the swivel nut.

Referring to FIG. 8, there is shown a swivel 69 being utilized with the liquid dispensing nozzle body 10 instead of the swivel 11 of FIG. 1. The swivel 69 includes a main body 70 having a first passage 71 communicating with the inlet end of the inlet passage 12 and a second passage 72 communicating with the outlet end of the vapor recovery passage 19. The second passage 72 does not extend around the passage 71 as can be seen in FIG. 11.

The main body 70 has an extension 73, which fits within the enlarged end of the tube 13 (see FIG. 8) of the nozzle body 10. The sealing rings 24, which are supported by the tube 13, provide a seal between the outer circular surface of the extension 73 of the main body 70 and the inner surface of the tube 13.

The main body 70 has an outer circular surface 74 having a swivel nut 75 rotatably supported thereon. A retaining ring 76, which is disposed in a groove 77 in the outer circular surface 74 of the main body 70, retains the swivel nut 75 on the main body 70.

The swivel nut 75 has threads 78 cooperating with the threads 32 at the enlarged end of the inner surface of the vapor recovery passage 19 in the nozzle body 10. Thus, the swivel 69 is connected or attached to the nozzle body 10 through the threads 78 on the swivel nut 75 cooperating with the threads 32 on the nozzle body 10 until a shoulder 79 on the swivel nut 75 abuts the end of the nozzle body 10 as shown in FIG. 8. Because of the retaining ring 76, the swivel 69 is prevented from being withdrawn from the nozzle body 10 after the swivel nut 75 is attached to the nozzle body 10.

A sealing ring 80, which is an O-ring, is disposed on the outer circular surface 74 of the main body 70 and cooperates with an inner circular surface 81 on the swivel nut 75 to form a seal therebetween. The sealing ring 80 is disposed between a shoulder 82 on the swivel nut 75 and a flange 83 on the main body 70. The sealing ring 80 is protected from dirt or other debris because of the swivel nut 75 overlying the sealing ring 80.

A sealing ring 83', which is an O-ring, is disposed between the swivel nut 75 and the enlarged outlet end of the vapor recovery passage 19 in the nozzle body 10. This prevents leakage between the threads 32 and 78.

Because of the main body 70 being rotatably supported within the swivel nut 75 and having the outer circular surface 74 as a bearing surface, the swivel 69 can rotate through 360° about an axis 84. The axis 84 is aligned with the axis of the inlet passage 12 of the nozzle body 10.

The main body 70 has a first bearing portion 85 and a second bearing portion 86 aligned with each other along an axis 87, which is substantially perpendicular to the axis 84. The first bearing portion 85 has a passage 88 therein communicating with the first passage 71 in the main body 70. The second bearing portion 86 has a passage 89 therein communicating with the second passage 72 in the main body 70.

The first bearing portion 85 rotatably supports a swivel tail or elbow 90 for rotation about the axis 87. The second bearing portion 86 rotatably supports a swivel tail or elbow 91 for rotation about the axis 87.

The swivel tails 90 and 91 are connected to each other by a metal bracket 92 (see FIG. 11), bolts 93, and nuts 94. The bracket 92 includes a pair of arms 95 and 96 and a connecting portion 97 extending between the arms 95 and 96.

One of the bolts 93 extends through a hole 98 in one end of the arm 95, a passage 99 extending through the swivel 90 and a hole 100 in one end of the arm 96. One of the nuts 94 retains the bolt 93 in position. The other of the bolts 93 extends through another of the holes 98 in the other end of the arm 95, a passage 101 extending through the swivel 91, and another of the holes 100 in the other end of the arm 96. The other of the nuts 94 retains the other of the bolts 93 in position. Thus, the swivel tails 90 and 91 are connected to each other so that they rotate together about the axis 87 (see FIG. 8).

The swivel tail 90 has a passage 102 therein communicating with the passage 88 in the first bearing portion 85 of the main body 70. The swivel tail 91 has a passage 103 therein communicating with the passage 89 in the second bearing portion 86 of the main body 70. Thus, any rotation of the swivel tails 90 and 91 about the axis 87 always leaves the passage 102 communicating with the passage 88 in the first bearing portion 85 of the main body 70 and the passge 103 in the swivel tail 91 communicating with the passage 89 in the second bearing portion 86 of the main body 70.

The swivel tail 90 is rotatably supported on a bushing 104, which has a substantially L-shaped cross section, for rotation about the axis 87. The bushing 104 has a first inner surface 105 and a second inner surface 106, which has a larger diameter than the first inner surface 105, functioning as bearing surfaces against a first outer surface 107 and a second outer surface 108, respectively, of the first bearing portion 85. The second outer surface 108 has a larger diameter than the first outer surface 107.

A sealing ring 109, which is an O-ring, seals between the bushing 104 and the first bearing portion 85. A second sealing ring 110, which is an O-ring, provides a seal between the outer surface of the bushing 104 and the swivel tail 90. The bushing 104 is retained in position on the first bearing portion 85 by a retaining ring 111, which is disposed in a groove 112 in the first outer surface 107 of the first bearing portion 85.

The bushing 104 has an annular curved groove 113 formed in its outer surface to cooperate with the bolt 93. This enables rotation between the bushing 104 and the swivel tail 90.

The swivel tail 91 is rotatably supported on a bushing 114, which has a substantially L-shaped cross section, for rotation about the axis 87. The bushing 114 has a first inner surface 115 and a second inner surface 116, which has a larger diameter than the first inner surface 115, functioning as bearing surfaces against a first outer surface 117 and a second outer surface 118, respectively, of the second bearing portion 86. The second outer surface 118 has a larger diameter than the first outer surface 117.

A sealing ring 119, which is an O-ring, seals between the bushing 114 and the second bearing portion 86. A second sealing ring 120, which is an O-ring, provides a seal between the outer surface of the bushing 114 and the swivel tail 91. The bushing 114 is retained in position on the second bearing portion 86 by a retaining ring 121, which is disposed in a groove 122 in the first outer surface 117 of the second bearing portion 86.

The bushing 114 has an annular curved groove 123 formed in its outer surface to cooperate with the bolt 93. This enables rotation between the bushing 114 and the swivel tail 91.

The passage 102 in the swivel tail 90 terminates in a tapered threaded passage 124. The passage 103 in the swivel tail 91 terminates in a tapered threaded passage 125.

The hose 55, which communicates with the tank supplying the gasoline to the nozzle body 10, is connected to the tapered threaded passage 124 in the swivel tail 90 in the same manner as described for connecting the hose 55 to the tapered threaded passage 53 (see FIG. 1) in the swivel tail 42. The hose 59, which is connected to the vapor recovery area, is connected to the tapered threaded passage 125 (see FIG. 8) in the swivel tail 91 in the same manner as the hose 59 is connected to the tapered threaded passage 54 (see FIG. 1) in the swivel tail 43.

Figure 9:
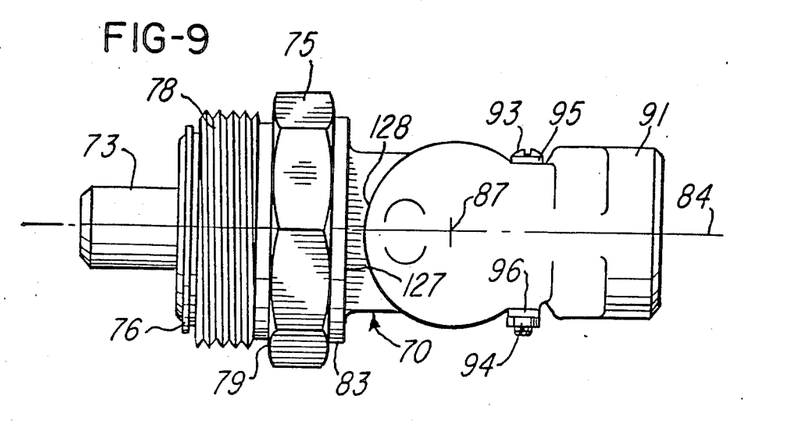
FIG. 9 is a top plan view of the swivel of FIG. 8.
Figure 10:
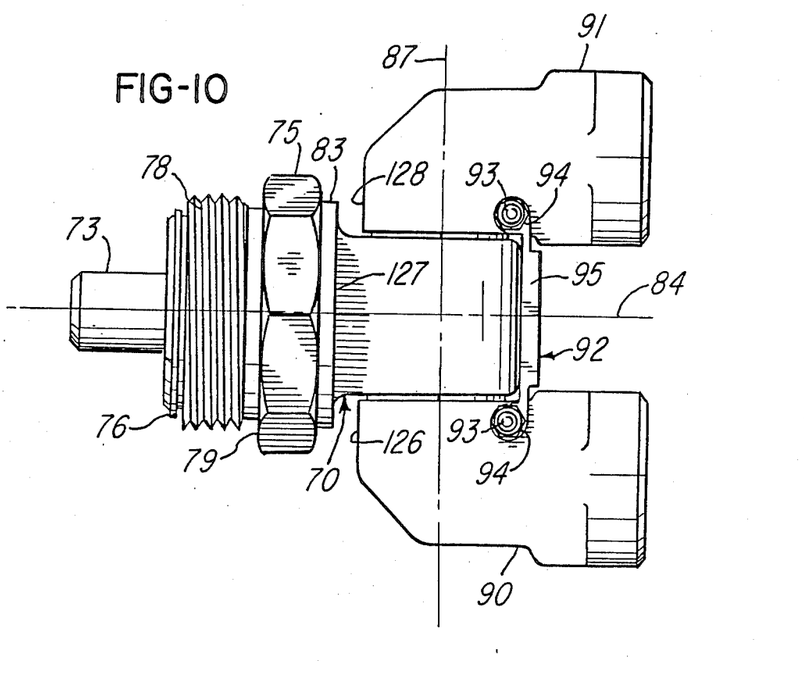
FIG. 10 is a side elevational view of the swivel of FIG. 8.

The amount of rotation of the swivel tails 90 (see FIG. 8) and 91 about axis 87 is limited by engagement of a portion of the swivel tail 90 beyond each end of an end surface 126 of the swivel tail 90 with an end surface 127 of the main body 70 and engagement of a portion of the swivel tail 91 beyond each end of an end surface 128 of the swivel tail 91 with the end surface 127 of the main body 70. Each of the end surfaces 126 and 128 is curved or arcuate as shown in FIG. 9 for the end surface 128 and is formed on a radius with the axis 87 as its center.

While the swivel tails 90 (see FIG. 8) and 91 have been shown and described as being connected to each other by the metal bracket 92, it should be understood that such is not necessary for the swivel tails 90 and 91 to be able to rotate about the axis 87. Thus, without the swivel tails 90 and 91 connected, each of the swivel tails 90 and 91 can rotate about the axis 87 without interfering with the other and without the hoses 55 and 59 interfering with each other.

An advantage of this invention is that there can be swiveling without interference of the two hoses. Another advantage of this invention is that the seals are not subjected to dirt or the like. A further advantage of this invention is that the liquid supply and vapor recovery passages require a minimum amount of space.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. In combination, a nozzle body having a first passage and a second passage extending therethrough and having a single threaded fluid connection at one end thereof which defines an enlarged end extension of an outer wall of said second passage and provides access to said first and second passages, said nozzle body having means for controlling flow of liquid through said first passage, a swivel having first means at one end thereof, attaching means attaching said first means of said swivel to said nozzle body, said attaching means comprising a threaded member threadedly attached to said threaded fluid connection and a retainer carried by said first means and engaging said threaded member, said first and second passages being concentric through a selected distance of said nozzle body at a location remote from said swivel and even with said swivel unattached from said nozzle body, said threaded member and retainer serving to rotatably support said first means for 360 degree rotation about a first axis, said first means having a first passage communicating with said first passage in said nozzle body by having an outer end portion thereof directly facing said first passage of said nozzle body and being coaxial with said first axis, said first means having a second passage communicating with said second passage in said nozzle body by having an outer end portion thereof directly facing said second passage of said nozzle body and being disposed on only one side of said first axis in offset spaced parallel relation thereto, second means rotatably supported by said first means for rotation about a second axis substantially perpendicular to said first axis, said second means having first connecting means for connecting said second means to a first hose and second connecting means for connecting said second means to a second hose, and said second means also having a first passage communicating at one end with said first passage in said first means and at its other end with said first hose and a second passage communicating at one end with said second passage in said first means and at its other end with said second hose.

2. The combination according to claim 1 in which said first means includes first and second bearing portions rotatably supporting said second means for rotation about said second axis, said first bearing portion having a passage extending therethrough and forming part of said first passage in said first means, and said second bearing portion having a passage extending therethrough and forming part of said second passage in said first means.

3. The combination according to claim 2 in which said second means includes a first body rotatably supported by said first bearing portion and having said first passage in said second means therein and a second body rotatably supported by said second bearing portion and having said second passage in said second means therein.

4. The combination according to claim 3 in which said second means includes means connecting said first body and said second body to each other for rotation together about said second axis, said first body has threaded means forming said first connecting means of said second means, and said second body has threaded means forming said second connecting means of said second means.

5. The combination according to claim 4 including first sealing means disposed between said first bearing portion of said first means and said first body and second sealing means disposed between said second bearing portion of said first means and said second body.

6. In combination, a nozzle body having a first passage and a second passage extending therethrough and having a single threaded fluid connection at one end thereof which provides access to said first and second passage, said nozzle body having means for controlling flow of liquid through said first passage, said first passage having an inlet for connection to a source of liquid under pressure, said first passage and said second passage being concentric through a selected distance from the inlet of said first passage, each of said first passage and said second passage having a substantially constant cross sectional area for said selected distance, said nozzle body having an elongated passage of circular cross section extending from adjacent one end of said nozzle body, a tube of circular cross section disposed within said elongated passage and concentric therewith, said tubing having its inner surface defining said first passage along said selected distance, said second passage being formed between said tube and said elongated passage along said selected distance, said tube terminating at its inlet prior to termination of said elongated passage in said nozzle body, said elongated passage having an increased cross sectional area beyond the termination of said tube which defines an enlarged end extension of an outer wall of said second passage, a swivel having first means at one end thereof, attaching means attaching said first means of said swivel to said nozzle body, said attaching means comprising a threaded member threadedly attached to said threaded fluid connection and a retainer carried by said first means and engaging said threaded member, said threaded member and retainer serving to rotatably support said first means for 360 degree rotation about a first axis, said first means having a first passage communicating with said first passage in said nozzle body by having an outer end portion thereof directly facing said first passage of said nozzle body and being coaxial with said first axis, said first means having a second passage communicating with said second passage in said nozzle body by having an outer end portion thereof directly facing said second passage of said nozzle body and being disposed on only one side of said first axis in offset spaced parallel relation thereto, and second means rotatably supported by said first means for rotation about a second axis substantially perpendicular to said first axis, said second means including first connecting means for connecting said second means to a first hose and second connecting means for connecting said second means to a second hose, and said second means having a first passage communicating at one end with said first passage in said first means and at its other end with said first hose and a second passage communicating at one end with said second passage in said first means and at its other end with said second hose.

7. The combination according to claim 6 in which said first means includes first and second bearing portions rotatably supporting said second means for rotation about said second axis, said first bearing portion having a passage extending therethrough and forming part of said first passage in said first means, and said second bearing portion having a passage extending therethrough and forming part of said second passage in said first means.

8. The combination according to claim 7 in which said second means includes a first body rotatably supported by said first bearing portion and having said first passage in said second means therein and a second body rotatably supported by said second bearing portion and having said second passage in said second means therein.

9. The combination according to claim 8 in which said second means includes means connecting said first body and said second body to each other for rotation together about said second axis, said first body has threaded means forming said first connecting means of said second means, and said second body has threaded means forming said second connecting means of said second means.

10. The combination according to claim 9 including first sealing means disposed between said first bearing portion of said first means and said first body and second sealing means disposed between said second bearing portion of said first means and said second body.

11. In combination, a nozzle body having a first passage and a second passage extending therethrough and having a single threaded fluid connection at one end thereof which defines an enlarged end extension of an outer wall of said second passage and provides access to said first and second passages, said nozzle body having means for controlling flow of liquid through said first passage, said first passage having an inlet for connection to a source of liquid under pressure, said first passage and said second passage being concentric through a selected distance from the inlet of said first passage, each of said first passage and said second passage having a substantially constant cross sectional area for said selected distance, a swivel having first means at one end thereof, attaching means attaching said first means of said swivel to said nozzle body, said attaching means comprising a threaded member threadedly attached to said threaded fluid connection and a retainer carried by said first means and engaging said threaded member, said first and second passages being concentric through said selected distances of said nozzle body and at a location remote from said swivel and even with said swivel unattached from said nozzle body, said threaded member and retainer serving to rotatably support said first means for 360 degree rotation about a first axis, said first means having a first passage communicating with said first passage in said nozzle body by having an outer end portion thereof directly facing said first passage of said nozzle body and being coaxial with said first axis, said first means having a second passage communicating with said second passage in said nozzle body by having an outer end portion thereof directly facing said second passage of said nozzle body and being disposed on only one side of said first axis in offset spaced parallel relation thereto, second means rotatably supported by said first means for rotation about a second axis substantially perpendicular to said first axis, said second means having first connecting means for connecting said second means to a first hose and second connecting means for connecting said second means to a second hose, and said second means also having a first passage communicating at one end with said first passage in said first means and at its other end with said first hose and a second passage communicating at one end with said second passage in said first means and at its other end with said second hose.

12. The combination according to claim 11 in which said first means includes first and second bearing portions rotatably supporting said second means for rotation about said second axis, said first bearing portion having a passage extending therethrough and forming part of said first passage in said first means, and said second bearing portion having a passage extending therethrough and forming part of said second passage in said first means.

* * * * *